United States Patent [19]

Oguro et al.

[11] Patent Number: 5,724,474
[45] Date of Patent: Mar. 3, 1998

[54] DIGITAL RECORDING AND REPRODUCING APPARATUS AND INDEX RECORDING METHOD

[75] Inventors: Masaki Oguro, Tokyo; Ken Iizuka, Kanagawa, both of Japan

[73] Assignee: Sony Corporation, Tokyo, Japan

[21] Appl. No.: 446,642

[22] PCT Filed: Sep. 29, 1994

[86] PCT No.: PCT/JP94/01608

§ 371 Date: May 25, 1995

§ 102(e) Date: May 25, 1995

[87] PCT Pub. No.: WO95/09419

PCT Pub. Date: Apr. 6, 1995

[30] Foreign Application Priority Data

Sep. 30, 1993 [JP] Japan .................... 5-268053

[51] Int. Cl.$^6$ .................................................... H04N 5/76
[52] U.S. Cl. .................................................. 386/95; 386/96
[58] Field of Search ............................ 358/341, 343;
360/19.1, 32, 48, 39, 72.1, 72.2; 386/83,
98, 96, 95, 104, 124, 69; H04N 5/76

[56] References Cited

U.S. PATENT DOCUMENTS

| | | | |
|---|---|---|---|
| 4,872,068 | 10/1989 | Ishii et al. ................ | 358/342 |
| 5,355,229 | 10/1994 | Arano et al. .............. | 358/343 |
| 5,390,027 | 2/1995 | Henmi et al. ............. | 386/83 |
| 5,513,010 | 4/1996 | Kori et al. ................ | 358/341 |

FOREIGN PATENT DOCUMENTS 0341319  11/1989  European Pat. Off. ...... G11B 15/087

*Primary Examiner*—Amelia Au
*Assistant Examiner*—LuAnne P. Din
*Attorney, Agent, or Firm*—William S. Frommer; Alvin Sinderbrand

[57] ABSTRACT

In a digital recording and reproducing apparatus, at least a first area to record an image signal and a second area to record an audio signal are provided on a recording medium, the digitized image signal and audio signal are separately recorded in the areas. The apparatus has arrangement for recording image annexed information annexed to the image signal into a third area provided for the first area and arrangement for recording audio annexed information annexed to the audio signal into a fourth area provided for the second area. Recording start identification information is recorded in the third and fourth areas for only a predetermined period after the start of the recording.

18 Claims, 15 Drawing Sheets

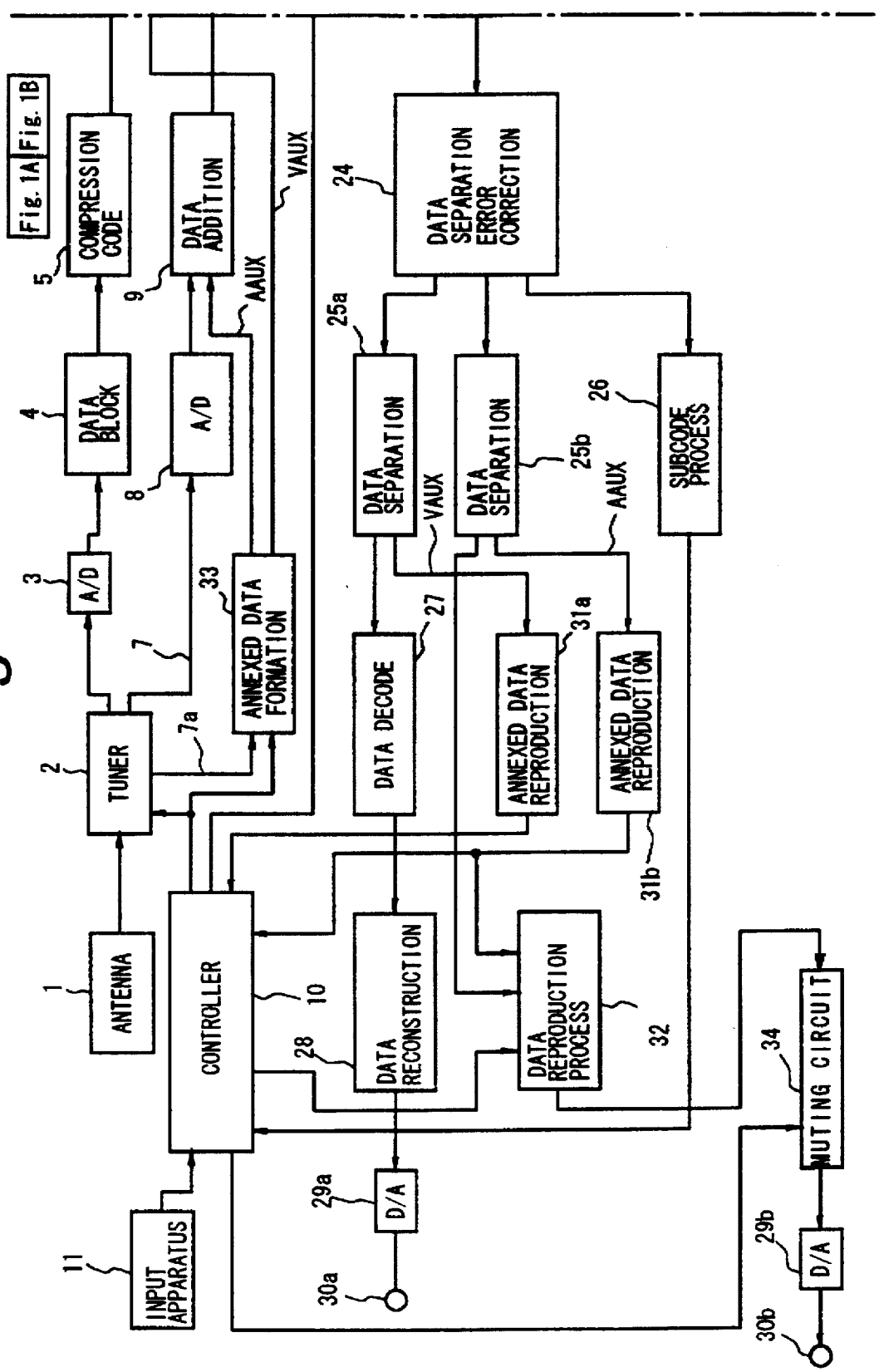

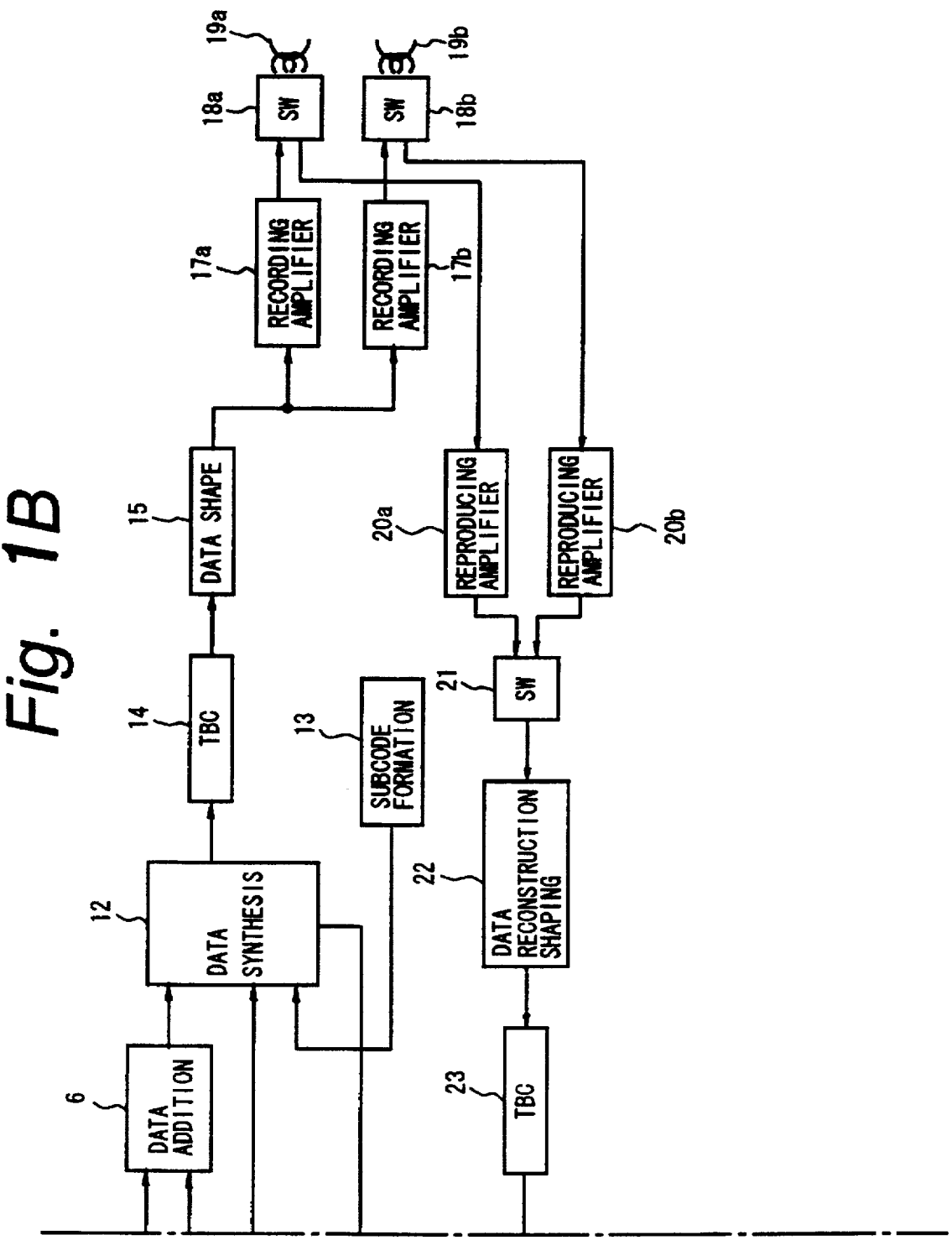

| WORD NAME | MSB　　　　　　　　　　　　　　　　　　LSB |
|---|---|
| PC0 | HEADER |
| PC1 | DATA |
| PC2 | |
| PC3 | |
| PC4 | |

Fig. 10
|   | 1 | 2 | 3 | 4 | 5 | 6 | 7 | 8 | 9 | 10 |
|---|---|---|---|---|---|---|---|---|---|----|
| 8 | 55 | f | 55 | ↑ | 55 | ↑ | 55 | ↑ | 55 | ↑ |
| 7 | 54 | e | 54 | ⋮ | 54 | ⋮ | 54 | ⋮ | 54 | ⋮ |
| 6 | 53 | d | 53 | ⋮ | 53 | ⋮ | 53 | ⋮ | 53 | ⋮ |
| 5 | 52 | 55 | 52 | 55 | 52 | 55 | 52 | 55 | 52 | 55 |
| 4 | 51 | 54 | 51 | 54 | 51 | 54 | 51 | 54 | 51 | 54 |
| 3 | 50 | 53 | 50 | 53 | 50 | 53 | 50 | 53 | 50 | 53 |
| 2 | c | 52 | ↑ | 52 | ↑ | 52 | ↑ | 52 | ↑ | 52 |
| 1 | b | 51 | h | 51 | ⋮ | 51 | ⋮ | 51 | ⋮ | 51 |
| 0 | a | 50 | g | 50 |   | 50 | ⋮ | 50 |   | 50 |
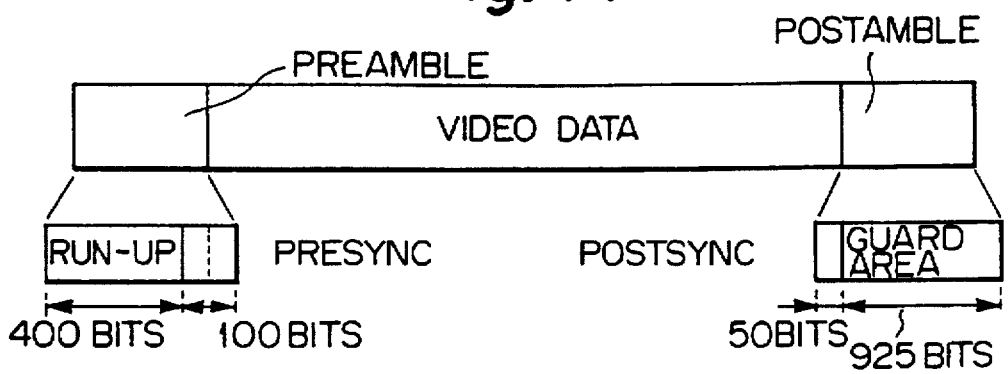
Fig. 11
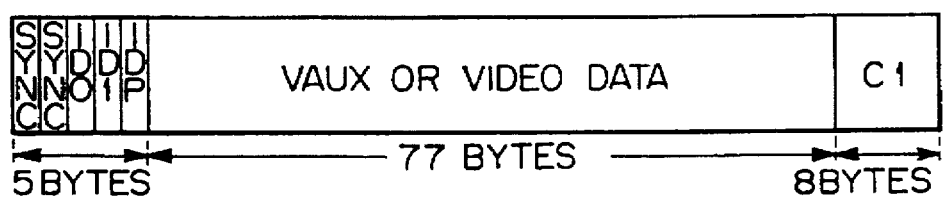
Fig. 12

Fig. 16A
|  | ID0 | ID1 |
|---|---|---|
| MSB | APPL I 2 | SYNC 7 |
|  | APPL I 1 | SYNC 6 |
|  | APPL I 0 | SYNC 5 |
|  | SEQ 0 | SYNC 4 |
|  | TRACK 3 | SYNC 3 |
|  | TRACK 2 | SYNC 2 |
|  | TRACK 1 | SYNC 1 |
| LSB | TRACK 0 | SYNC 0 |
Fig. 16B
|  | ID0 | ID1 |
|---|---|---|
| MSB | SEQ 3 | SYNC 7 |
|  | SEQ 2 | SYNC 6 |
|  | SEQ 1 | SYNC 5 |
|  | SEQ 0 | SYNC 4 |
|  | TRACK 3 | SYNC 3 |
|  | TRACK 2 | SYNC 2 |
|  | TRACK 1 | SYNC 1 |
| LSB | TRACK 0 | SYNC 0 |
Fig. 17
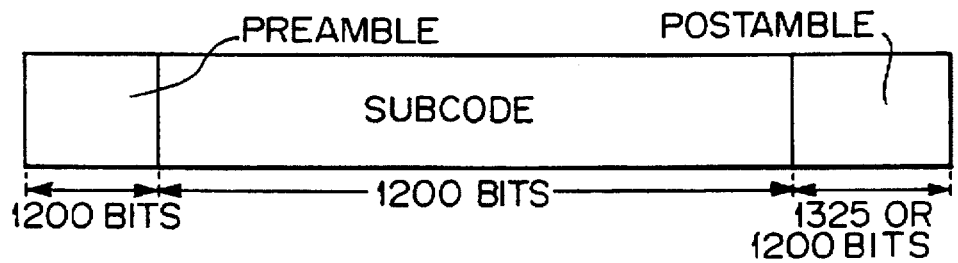
Fig. 18
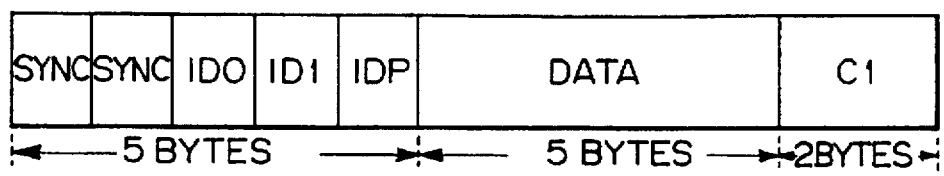

Fig. 19A

|  | ID0 | ID1 |
|---|---|---|
| MSB | F/R | ABSTR3 |
|  | AP33 | ABSTR2 |
|  | AP32 | ABSTR1 |
|  | AP31 | ABSTR0 |
|  | ABSTR7 | SYNC3 |
|  | ABSTR6 | SYNC2 |
|  | ABSTR5 | SYNC1 |
| LSB | ABSTR4 | SYNC0 |

Fig. 19B

|  | ID0 | ID1 |
|---|---|---|
| MSB | F/R | ABSTR3 |
|  | INDEX | ABSTR2 |
|  | SKIP | ABSTR1 |
|  | PP | ABSTR0 |
|  | ABSTR7 | SYNC3 |
|  | ABSTR6 | SYNC2 |
|  | ABSTR5 | SYNC1 |
| LSB | ABSTR4 | SYNC0 |

Fig. 20

|    | 1 | 2 | 3 | 4 | 5 | 6 | 7 | 8 | 9 | 10 |
|----|---|---|---|---|---|---|---|---|---|----|
|    | C | C | C | C | C | E | E | E | E | E |
|    | B | B | B | B | B | D | D | D | D | D |
| 10 | A | A | A | A | A | A | A | A | A | A |
|    | f | c | f | c | f | l | i | l | i | l |
|    | e | b | e | b | e | k | h | k | h | k |
|    | d | a | d | a | d | j | g | j | g | j |
|    | C | C | C | C | C | E | E | E | E | E |
|    | B | B | B | B | B | D | D | D | D | D |
| 5  | A | A | A | A | A | A | A | A | A | A |
|    | c | f | c | f | c | i | l | i | l | i |
|    | b | e | b | e | b | h | k | h | k | h |
| 0  | a | d | a | d | a | g | j | g | j | g |

Fig. 21

|  | MSB | RECORDING START | | | | | | LSB |
|---|---|---|---|---|---|---|---|---|
| PC0 | 0 | 1 | 1 | 0 | 0 | 0 | 0 | 1 |
| PC1 | RESERVED | | | | | | SS | |
| PC2 | | 1 | RECORDING MODE | | 1 | DISPLAY | | |
| PC3 | FF | FS | FC | IL | ST | SC | BCSYS | |
| PC4 | 1 | GENRE CATEGORY | | | | | | |

Fig. 22

|  | MSB | RECORDING START | RECORDING END | | | | | LSB |
|---|---|---|---|---|---|---|---|---|
| PC0 | 0 | 1 | 0 | 1 | 0 | 0 | 0 | 1 |
| PC1 | RESERVED | | | | | | SS | |
| PC2 | | | RECORDING MODE | | INSEART CH | | | |
| PC3 | DRF | SPEED | | | | | | |
| PC4 | 1 | GENRE CATEGORY | | | | | | |

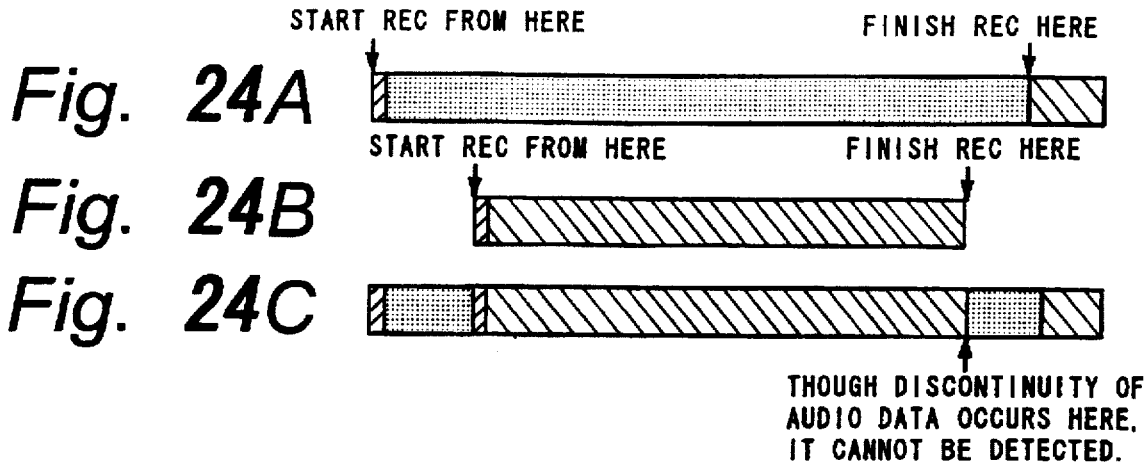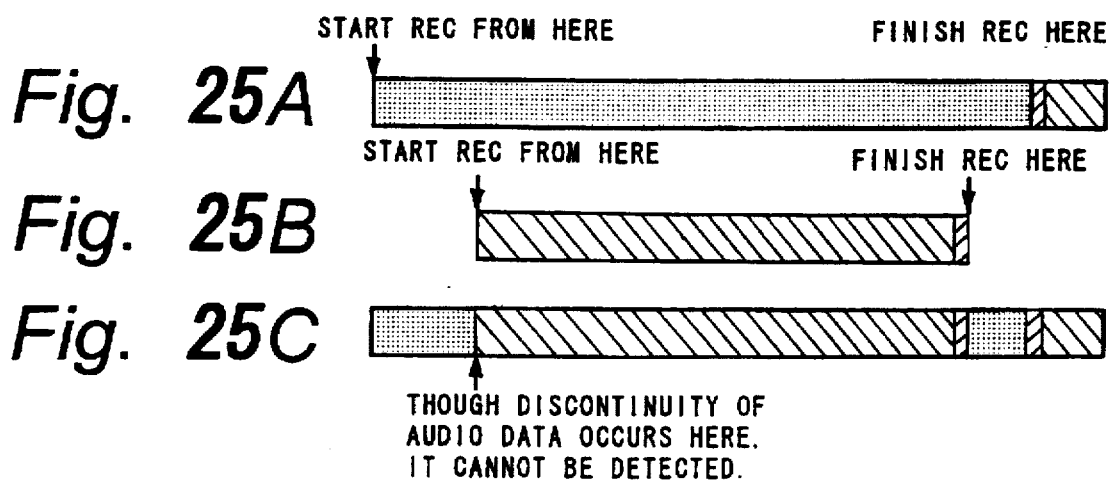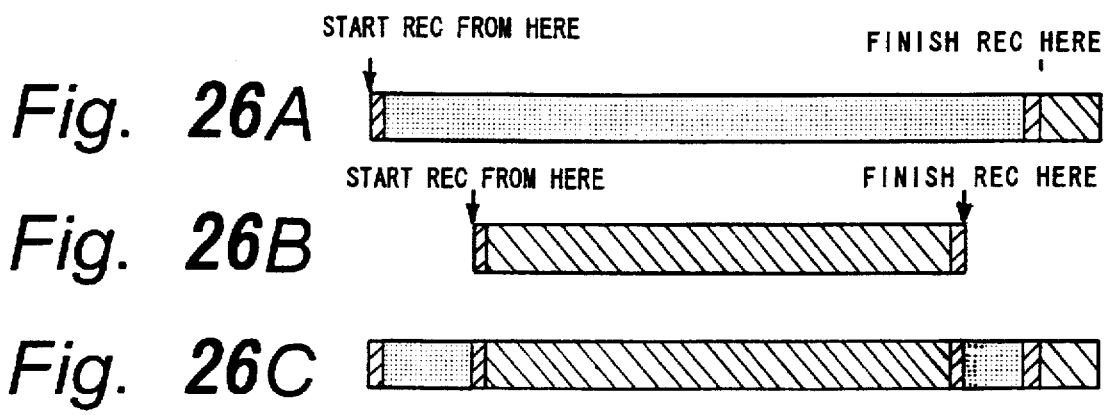

| | MSB | | | | | | | LSB |
|---|---|---|---|---|---|---|---|---|
| PC 0 | 0 | 1 | 1 | 0 | 0 | 0 | 0 | 0 |
| PC 1 | TENS OF TV CHANNEL | | | | UINTS OF TV CHANNEL | | | |
| PC 2 | B/W | | EN | | CLF | | INSERT CH | |
| PC 3 | SOURCE CODE | | | | 50/60 | | S TYPE | |
| PC 4 | TUNER CATEGORY | | | | | | | |

5,724,474

DIGITAL RECORDING AND REPRODUCING APPARATUS AND INDEX RECORDING METHOD

TECHNICAL FIELD

The invention relates to a digital recording and reproducing apparatus and an index recording method which, for example, can easily perform an edition or the like and can prevent a disturbance of an audio system.

BACKGROUND

A development of a digital VCR for digitizing video data and recording it onto a magnetic tape is being progressed. Since a transmission band of digital video data is extremely wide, the digital video data is subjected to, for example, a DCT conversion or the like and, after that, the data is recorded onto the magnetic tape.

An index for a head search of a program is provided for a tape which is used in the above-mentioned digital VCR. The index is recorded in another area together with image data and audio data upon recording. A start point of the recording can be retrieved by a searching operation by using such an index. Since the index is recorded in the other area different from the areas of the image data and audio data, the index can be after-recorded or can be erased later. Therefore, a marking or the like of not only a start point of the actual recording but also a desired point can be performed.

The same signal is used for the index indicative of the foregoing recording start point and the index for marking. Consequently, those signals cannot be distinguished. For instance, in spite of the fact that the user wants to search a head of a certain program, the search is stopped at every point at which the index for marking was recorded. The user has to confirm an image every time and repeat the searching operation.

In case of photographing by a camera integrated type VTR which can perform such an index recording, when the camera integrated type VTR is carried or it is set to a standby mode or the like, there is a case such that the mode is erroneously set to a recording mode and a video image is recorded independent of the user's will. Since a vain photographing is executed for such a period of time, the tape has to be returned to an original recording start position.

When an audio after-recording is performed, further, the recording is ordinarily performed a plurality of number of times. At this time as well, for example, a counter is reset and when the recording is failed, the tape is rewound to such a reset point. Actually, however, the tape is not accurately returned to the reset point noise sounds remain. At the time of the rerecording, therefore, the tape is rewound to a point that is slightly preceding from the original start point, the recording is started, a no-sound period is provided, and after the data which had been recorded before was erased, the recording is again performed. As mentioned above, the operations are complicated in case of performing the audio after-recording.

It is, therefore, an object of the invention to provide a digital recording and reproducing apparatus and an index recording method which can clearly distinguish a start position of a program and other points and can easily record an image or sounds again.

DISCLOSURE OF INVENTION

According to the invention, there is provided a digital recording and reproducing apparatus in which at least a first area for recording an image signal and a second area for recording an audio signal are provided on a recording medium and the image signal and audio signal which were digitized are separately recorded in those areas, respectively, characterized in that the apparatus comprises means for recording image annexed information annexed to the image signal into a third area provided in the first area and means for recording audio annexed information annexed to the audio signal into a fourth area provided in the second area and that recording start identification information is recorded in the third and fourth areas for only a predetermined period of time after the recording was started.

According to the invention, there is also provided an index recording method of a digital recording and reproducing apparatus in which at least a first area for recording an image signal and a second area for recording an audio signal are provided on a recording medium and the digitized image signal and audio signal which were digitized are separately recorded in those areas, respectively, characterized in that an index indicative of the recording start is recorded in each of the first and second areas at the time of the recording start, respectively.

BRIEF DESCRIPTION OF DRAWINGS

FIGS. 1A and 1B are block diagrams of a digital VCR according to the invention;

FIG. 10 is a diagram in which nine packs of AAUX data are extracted and arranged in the direction of a track;

FIG. 11 is a diagram showing a structure of a video sector;

FIG. 12 is a diagram showing a structure of one sync block of the video sector;

FIG. 14 is a diagram showing sync blocks which are used only for VAUX data;

FIGS. 16A and 16B are diagrams each showing data which is recorded in an ID section;

FIG. 17 is a diagram showing a subcode sector;

FIG. 18 is a diagram showing a structure of a subcode of one sync block;

FIGS. 19A and 19B are diagrams each showing a structure of ID0 and ID1 in the sync block of the subcode which is used at the time of a high speed searching;

FIG. 20 is a diagram showing a data section of the subcode;

FIG. 21 is a diagram showing a VAUX source control pack;

FIG. 22 is a diagram showing an AAUX source control pack;

FIGS. 24A, 24B and 24C are diagrams which are used for explanation of an REC end flag of AAUX;

FIGS. 25A, 25B and 25C are diagrams which are used for explanation of the REC end flag of AAUX;

FIGS. 26A, 26B and 26C are diagrams which are used for explanation of the REC end flag of AAUX;

BEST MODE FOR CARRYING OUT THE INVENTION

Figures 2, 3:
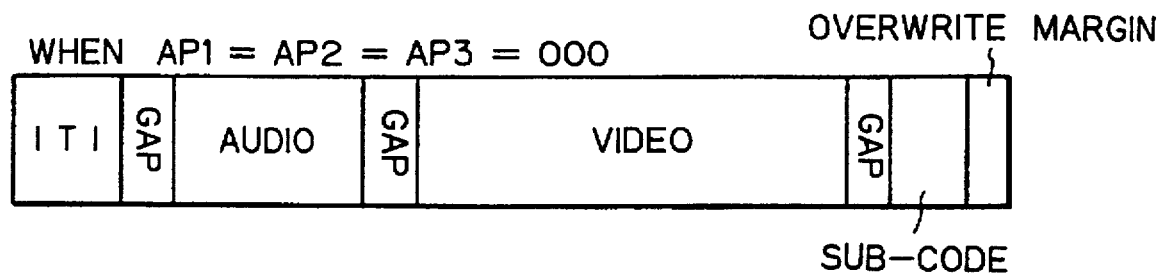
FIG. 2 is a diagram which is used for explanation of a track format.
FIG. 3 is a diagram showing a fundamental construction of a pack.

A preferred embodiment of the invention will now be described hereinbelow with reference to the drawings. To explain clearly, explanation will be made in accordance with the following order.

(A) with respect to a digital VCR according to the invention (B) with respect to a track format (C) with respect to a REC start/end flag and an index ID (A) With respect to a digital VCR according to the invention FIGS. 1A and 1B are block diagrams of a digital VCR according to the invention. According to the digital VCR to which the invention is applied, a video signal is digitized and is compressed by a DCT conversion and is recorded onto a magnetic tape by rotary heads.

The operation in the recording mode will be first described. In FIGS. 1A and 1B, a television broadcast is received by an antenna 1. A reception signal of the antenna 1 is supplied to a tuner section 2. A channel set signal is supplied from a controller 10 to the tuner section 2. A channel set input is supplied from an input apparatus 11 to the controller 10. A reception signal of a desired channel is selected from the received television broadcast by the tuner section 2 on the basis of the channel set signal. A video signal and an audio signal of the selected television broadcast are demodulated by the tuner section 2.

An obtained composite video signal is converted to a component video signal consisting of, for example, a luminance signal Y and color difference signals R-Y and B-Y by the tuner section 2 and is outputted. The video signal is supplied to an A/D converting section 3. The video signal is digitized by the A/D converting section 3. An output of the A/D converting section 3 is supplied to a data block forming section 4. The video signal is shuffled and, for example, (8×8) blocks are formed by the data block forming section 4. An output of the data block forming section 4 is supplied to a compression encoding section 5.

The compression encoding section 5 DCT converts the block-formed video signal and, further, variable-length encodes the converted video signal by using, for example, a 2-dimensional Huffman code, thereby quantizing so that a code amount of a predetermined buffer unit is equal to or smaller than a predetermined amount. An output of the compression encoding section 5 is supplied to a data adding section 6.

VAUX (Video Auxiliary) data is supplied from an annexed data forming section 33 to the data adding section 6. The VAUX data includes a channel number, monochrome/color, a source code, a channel category, a recording time, recording year/month/day, and a recording start index, which will be described hereinlater. In order to form the VAUX data like such annexed data, various kinds of data are supplied from the controller 10 to the annexed data forming section 33. The VAUX data is added to the video data outputted from the compression encoding section 5 by the data adding section 6. The video data to which the VAUX data was added as mentioned above is supplied to a data synthesizing section 12.

Audio data is outputted from the tuner section 2. The audio data is supplied to an A/D converting section 8. The audio data is digitized by the A/D converting section 8. An output of the A/D converting section 8 is supplied to a data adding section 9. AAUX (Audio Auxiliary) data is supplied from the annexed data forming section 33 to the data adding section 9. The AAUX data includes 2 channel/4 channel, a sampling frequency, presence or absence of emphasis, a recording time, recording year/month/day, and a recording start index and a recording end index, which will be described hereinlater. The AAUX data is added to the audio data by the data adding section 9. A parity for error correction is added in the horizontal and vertical directions. As mentioned above, the audio data to which the AAUX data was added is supplied to the data synthesizing section 12.

A subcode forming section 13 is further provided. A subcode is data for a high speed search of about a 200-times speed and comprises a time code, a track number, and the like, and a parity for protecting them. The subcode from the subcode forming section 13 is supplied to the data synthesizing section 12.

The video data from the data adding section 6, audio data from the data adding section 9, and subcode data from the subcode forming section 13 are synthesized by the data synthesizing section 12.

An output of the data synthesizing section 12 is supplied to a P/S (parallel/serial) converting section 14. Parallel data is converted to serial data by the P/S converting section 14 in order to record onto a tape. An output of the P/S converting section 14 is supplied to a data shaping section 15. Recording data is, for example, 24–25 modulated (modulating system for converting data of 24 bits to data of 25 bits and recording) and a DC component is eliminated by the data shaping section 15. After that, frequency characteristics are changed in accordance with tape characteristics by an equalizer circuit.

An output of the data shaping section 15 is supplied to heads 19a and 19b via recording amplifiers 17a and 17b, switches 18a and 18b. The switches 18a and 18b are switched in the recording mode and reproducing mode. Compressed video data, audio data, and subcode data are recorded onto a magnetic tape (not shown) by the heads 19a and 19b.

The operation in the reproducing mode will now be described. The recording data of the tape is reproduced by the heads 19a and 19b and is supplied to each of reproducing amplifiers 20a and 20b through the switches 18a and 18b. Outputs of the reproducing amplifiers 20a and 20b are supplied to a switch 21. A head switching signal is supplied to the switch 21. An output of the switch 21 is supplied to a data reconstruction shaping section 22. Inverse characteristics of the equalizer circuit on the recording side are applied by the data reconstruction shaping section 22, thereby returning to the original frequency characteristics. Thus, reproduction data of a mechanism is demodulated. An output of the data reconstruction shaping section 22 is supplied to a TBC (Time Base Corrector) 23. The TBC 23 corrects a time base of the reproduction data and eliminates a jitter component of the mechanism and, after that, performs, for example, a 24–25 inverse conversion. An output of the TBC 23 is supplied to a data separating section 24.

The data separating section 24 first converts the input serial data into parallel data of eight bits and, after that, separates the reproduction data to the video data, audio data, and subcode data.

The video data from the data separating section 24 is supplied to a data separating section 25a. The VAUX data has been added in the video data supplied to the data separating section 25a. An error correcting process is executed by using such a parity by the data separating section 25a, thereby separating to the actual video data and VAUX data. The actual video data is supplied to a data decoding section 27. The separated VAUX data is supplied to an annexed data reproducing section 31a. The VAUX data is reproduced by the annexed data reproducing section 31a. The reproduced VAUX data is supplied to the controller 10.

The data decoding section 27 executed a decoding of the 2-dimensional Huffman code, an inverse quantization, and an inverse DCT to the reproduction data, thereby performing an expanding process of the compressed video data. An output of the data decoding section 27 is supplied to a data reconstructing section 28. A deblocking process is executed by the data reconstructing section 28. The digital component video data comprising the luminance signal Y and color difference signals R-Y and B-Y is outputted from the data reconstructing section 28. The digital component video data is supplied to a D/A converting section 29a. The digital component video data is converted to analog component video data by the D/A converting section 29a. The analog component video data is outputted from an output terminal 30a. In the case where the user wants to obtain a composite output, Y, R-Y, and B-Y are synthesized and a sync signal is added to the synthesized signal and the resultant signal is outputted.

The audio data from the data separating section 24 is supplied to a data separating section 25b. The AAUX data and parity have been added in the audio data supplied from the data separating section 25b. An error correcting process is executed by using such a parity and the actual audio data and AAUX data are separated by the data separating section 25b. The audio data is supplied to a data reproduction processing section 32. The separated AAUX data is supplied to an annexed data reproducing section 31b. The AAUX data is reproduced by the annexed data reproducing section 31b. The AAUX data is supplied to the controller 10 and data reproduction processing section 32.

The data reproduction processing section 32 executes a reproducing process of the audio data. The AAUX data reproduced by the annexed data reproducing section 31b is used as control data in the reproducing process of the audio data. The digital audio data outputted from the audio reproduction processing section 32 is supplied to a muting circuit 34. A control signal is supplied from the controller 10 to the muting circuit 34 and the digital audio data is muted as necessary. Output data of the muting circuit 34 is converted to the analog audio data by a D/A converting section 29b. The analog audio data is outputted from an output terminal 30b. The muting circuit 34 can be also constructed by a mean value interpolating circuit, a fade-in/fade-out circuit, or the like.

According to the digital VCR to which the invention is applied, as mentioned above, the VAUX data as addition data is added to the video data and the AAUX data as addition data is added to the audio data. Control information, recording time, information of recording year/month/day, recording start index, recording end index, and the like can be obtained from the VAUX data and AAUX data. Information of a time code, absolute number of the track, and the like can be obtained from the subcode information.

(B) With respect to a track format

A track format will now be described hereinbelow with reference to FIGS. 2 to 20. One frame is constructed by 10 tracks in the NTSC system and one frame is constructed by 12 tracks in the PAL system. One track of a tape for a digital VCR is constructed by an ITI area, an audio sector, a video sector, and a subcode sector in accordance with this order from an entrance side of the track. An IBG (Inner Block Gap) is provided between the sectors and a margin is provided after the subcode.

When explaining in detail, the ITI area as a timing block to certainly execute the after-recording is provided at a track entrance edge. Generally, it is difficult to obtain a contact of the head due to the relation of a mechanism precision or the like and it is unstable on the track entrance side. Consequently, a number of sync blocks each having a short sync length are recorded in the ITI area. Together with those sync blocks, the sync numbers are sequentially allocated to the sync blocks from the track entrance edge. In this instance, when considering a case of after-recording, by detecting an arbitrary one of the sync blocks recorded in the ITI area, the present position on the track is accurately detected from the number recorded there. An after-recording area can be decided on the basis of the detection of such a position.

One track is divided into a several sectors and a structure or the like of one sync block on the track of those sectors is specified by an APT (Application of a Track). For instance, in the case where a value of the APT is equal to "000", an area 1, an area 2, and an area 3 are specified on the track. Positions of those areas on the track, a sync block construction, an ECC construction to protect data from errors, gaps to compensate those areas, and an overwrite margin to compensate an overwriting are set. APn to decide a data structure of each area exists in each area. The meanings of APn are as follows.

AP1 . . . Data structure of the area 1 is set.

AP2 . . . Data structure of the area 2 is set.

AP3 . . . Data structure of the area 3 is set.

When APn of each area, namely, AP1, AP2, and AP3 are equal to "000", they are defined as follows.

AP1 . . . The data structure of AAUX data in the audio data of the VCR is obtained.

AP2 . . . The data structure of VAUX data in the video data of the VCR is obtained.

AP3 . . . An ID data structure in the subcode of the VCR is obtained.

In case of realizing the VCR, therefore, a value of the APT is set as follows as shown in FIG. 2.

AP1, AP2, AP3=000

Figure 9:
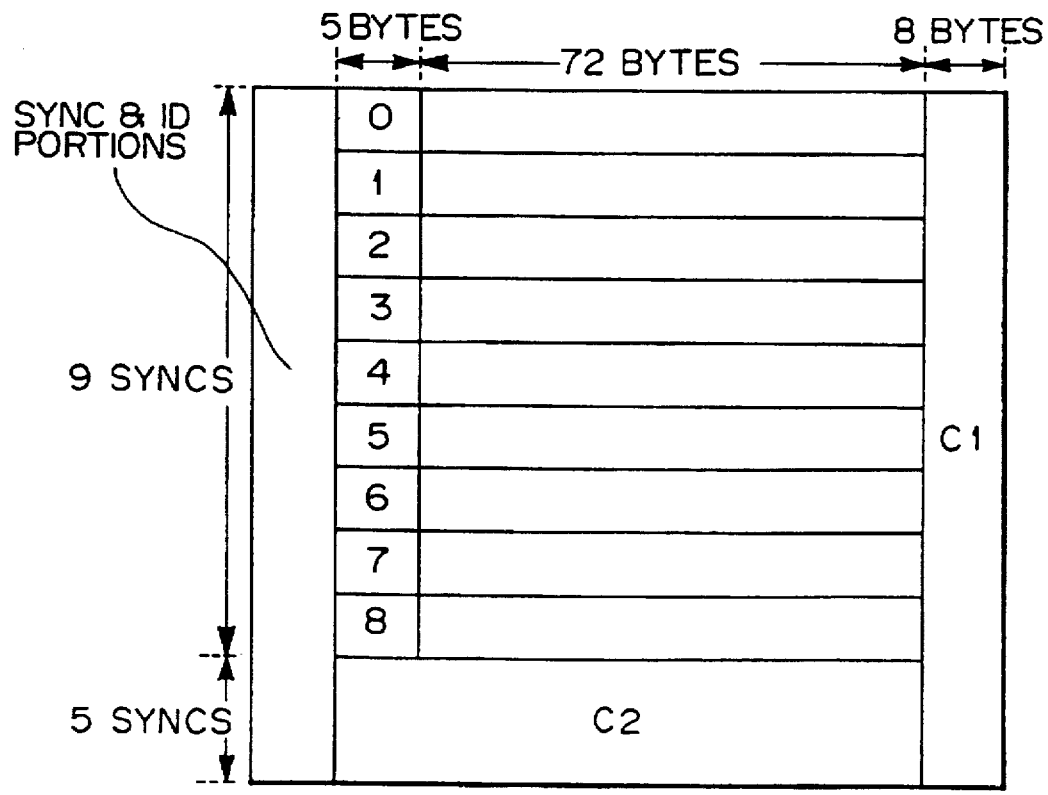
FIG. 9 is a diagram in which 14 sync blocks provided in the audio sector of one track are arranged in the vertical direction.

In the audio sector, the AAUX data is recorded in the former five bytes of the audio data (refer to FIG. 9). The VAUX data is recorded in the former two sync blocks and one sync block just before C2 in the video sector (refer to FIG. 13). The AAUX data and VAUX data are constructed on a "pack" unit basis as a fixed length block of five bytes. The "pack" indicates the minimum unit of a data group and one pack is constructed by collecting related data. FIG. 3 shows a fundamental construction of the pack. The first byte (PC0) is a header indicative of the contents of the data and the second byte (PC2) to the fifth byte (PC4) indicate data.

A hierarchy structure of the header will now be described hereinbelow. Eight bits of the header is divided into upper four bits and lower four bits. The upper four bits are set to an upper header and the lower four bits are set to a lower header, so that a two-hierarchy structure is formed. The header can be expanded to a lower hierarchy by assigning bits of data as necessary. By setting the header to the hierarchy structure as mentioned above, the contents of the pack are clearly systematized and the pack can be easily expanded. 256 spaces by the upper and lower headers are prepared as a pack header table together with the contents of each pack.

Figure 4:
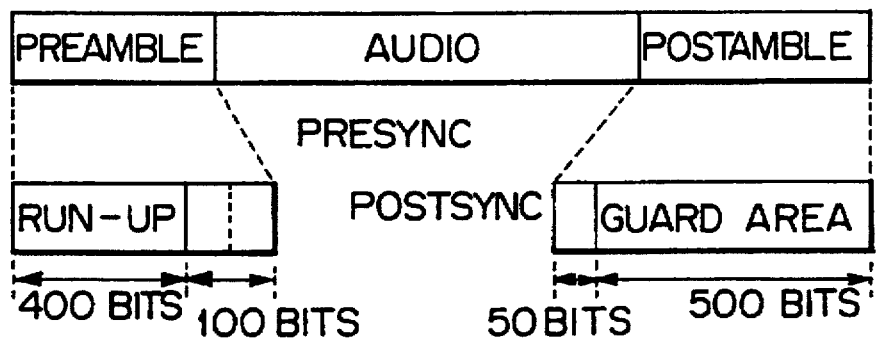
FIG. 4 is a diagram showing a construction of an audio sector.

FIG. 4 shows a construction of the audio sector. The audio sector is constructed by 14 sync blocks per one track. Since the audio data is 24–25 converted and, after that, the data is recorded, a total bit length is set as follows.

$$90 \times 14 \times 8 \times 25 \div 24 = 10,500 \text{ bits}$$

Each sync block comprises a preamble of 500 bits, an audio data area, and a postamble of 550 bits. The preamble comprises a run-up of 400 bits and a presync of 100 bits (two sync blocks). The run-up is used for pull-in of a PLL (Phase Locked Loop) and the presync is used as a predetection of an audio sync block. The postamble comprises the postsync of 50 bits (one sync block) and a guard area of 500 bits. The postsync is used to confirm an end of the audio sector by the sync number of the ID. The guard area is used to guard the data so as not to be superimposed to the audio sector when the video sector is after-recorded.

Figure 5:
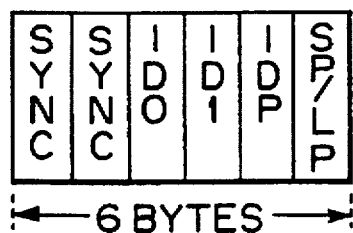
FIG. 5 is a diagram showing a presync in the audio sector.

FIG. 5 is an enlarged diagram of the presync in the audio sector shown in FIG. 4. The presync is constructed by six bytes of two sync bytes, an ID sections [ID0, ID2, IDP (ID parity)], and SP/LP. A value of SP/LP indicates SP in case of FFh and LP in case of 00h. An identification byte of SP/LP shown in FIG. 5 is data for protection and it is spare data of SP/LP existing in the above-mentioned TIA sector. That is, in the case where the value of the SP/LP of the TIA sector cannot be read out, SP/LP of the presync is read out.

Figure 6:
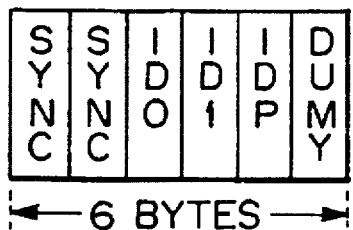
FIG. 6 is a diagram showing a postsync in the audio sector.

FIG. 6 is an enlarged diagram of the postsync shown in FIG. 4. The postsync is constructed by six bytes of two sync bytes, an ID section (ID0, ID1, IDP), and a DUMY. The DUMY stores FFh as dumy data.

The six bytes of each of the presync and postsync are subjected to the 24–25 conversion and, after that, the data is recorded. Consequently, the total bit lengths are set as follows.

$$\text{presync } 6 \times 2 \times 8 \times 25 \div 24 = 100 \text{ bits}$$

$$\text{postsync } 6 \times 1 \times 8 \times 25 \div 25 = 50 \text{ bits}$$

Figure 7:
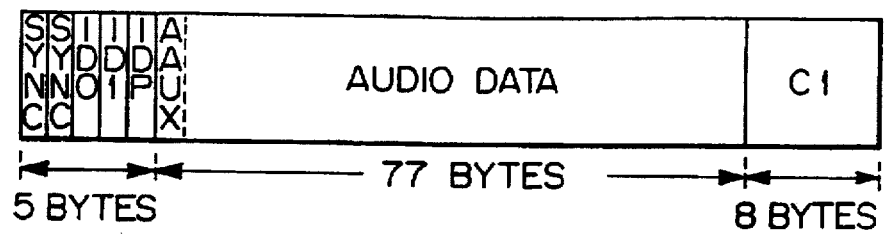
FIG. 7 is a diagram showing a sync block structure of the first to ninth syncs in the audio sector.

FIG. 7 shows a sync block structure from the first to ninth syncs of the audio sector. One sync block comprises 90 bytes. The former five bytes of one sync block has a structure similar to that of each of the foregoing presync and postsync. The former five bytes of the audio data area consisting of 77 bytes is used for the AAUX data (Audio Auxiliary data). As mentioned above, the AAUX data is the annexed data of the audio signal which is recorded in the audio sector of the track. As such data, there is the following data. Namely, as such data, there are 2 channel/4 channel, a sampling frequency, a source code, source data indicative of the presence or absence of emphasis, a recording time (hour, minute, second, and the like) of the audio data, recording time data indicative of a frame number, source control data indicative of a recording start index and a recording end index of the audio data, and the like. An audio data area of 72 bytes is provided after the AAUX data of five bytes. A horizontal parity C! of eight bytes is provided after the audio data area.

Figure 8:
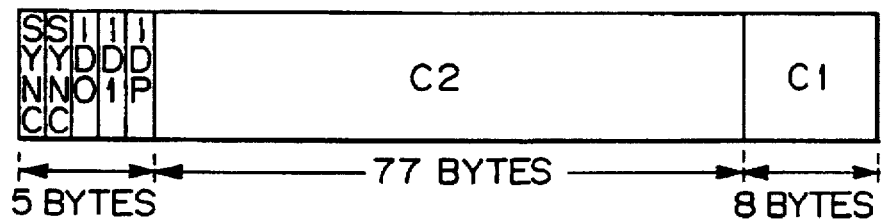
FIG. 8 is a diagram showing a sync block structure of a parity C2 of the tenth to fourteenth syncs of the audio sector.

FIG. 8 is a diagram showing a sync block structure of the parity C2 from the tenth to fourteenth syncs of the audio sector. As will be understood from FIG. 8, the first five bytes have a sync structure similar to that shown in FIG. 7. The vertical parity C2 of 77 bytes is subsequently provided and the horizontal parity C1 is finally provided.

FIG. 9 is a diagram in which 14 sync blocks provided in the audio sector of one track are arranged in the vertical direction. The five sync blocks shown in FIG. 8 are sequentially arranged next to the nine sync blocks shown in FIG. 7.

FIG. 10 is a diagram in which nine packs of the AAUX data of one track are extracted and arranged by ten tracks (one frame in the NTSC). Numerals (1 to 10) written in the lateral direction denote track numbers and numerals (0 to 8) written in the vertical direction indicate the pack numbers shown in FIG. 9, respectively. One video frame is constructed by 10 tracks in case of a system of 525 lines/60 Hz and is constructed by 12 tracks in case of a system of 625 lines/50 Hz. The audio data and subcode are also recorded and reproduced on the basis of the one video frame.

As shown in FIG. 10, values (hexadecimal numbers) of the pack header of 50 to 55 are recorded. The packs of 50 to 55 are recorded in each track. Namely, the same pack is recorded ten times in 10 tracks. This portion is called a main area. Since indispensable items such as sampling frequency, number of quantized bit, and the like which are necessary to reproduce the audio data are mainly stored there, the same pack is recorded the number of times for the data protection. Consequently, the data of the main area can be also reproduced even in case of a scratch in the lateral direction, a one-side channel clog, or the like which is likely to occur in a tape transport.

FIG. 11 shows a structure of the video sector. The video sector is constructed by 149 sync blocks per one track and comprises a preamble of 500 bits, a video data area of 111, 750 bits (135 sync blocks), and a postamble of 975 bits. The preamble comprises a run-up of 400 bits and a presync of 100 bits (two sync blocks). The run-up is used for pull-in of the PLL and the presync is used as a predetection of the video sync block. The postamble comprises a postsync block of 50 bits (one sync block) and a guard area of 925 bits. The number of bytes of the guard area is larger than that of the guard area in the postamble provided in the audio sector.

FIG. 12 shows a structure of one sync block of the video sector. One sync block of the video sector is constructed by 90 bytes. Among 90 bytes, a structure of the first five bytes is similar to that of each of the presync and postsync in the audio sector. Next 77 bytes relate to a data area in which the video data or VAUX (Video Auxiliary) data is recorded. The video data is recorded on a buffer unit basis. One buffer unit is constructed by five sync blocks. The VAUX data is annexed data of the video signal. Such data includes the following data. That is, as such data, there are a channel number, monochrome, a source code, source data indicative of a tuner category or the like, recording time data indicative of a recording time (hour, minute, second, or the like) of the video data and a frame number, source control data indicative of a recording start index of the video data, and the like. The horizontal parity C1 is provided after the data area.

Figure 13:
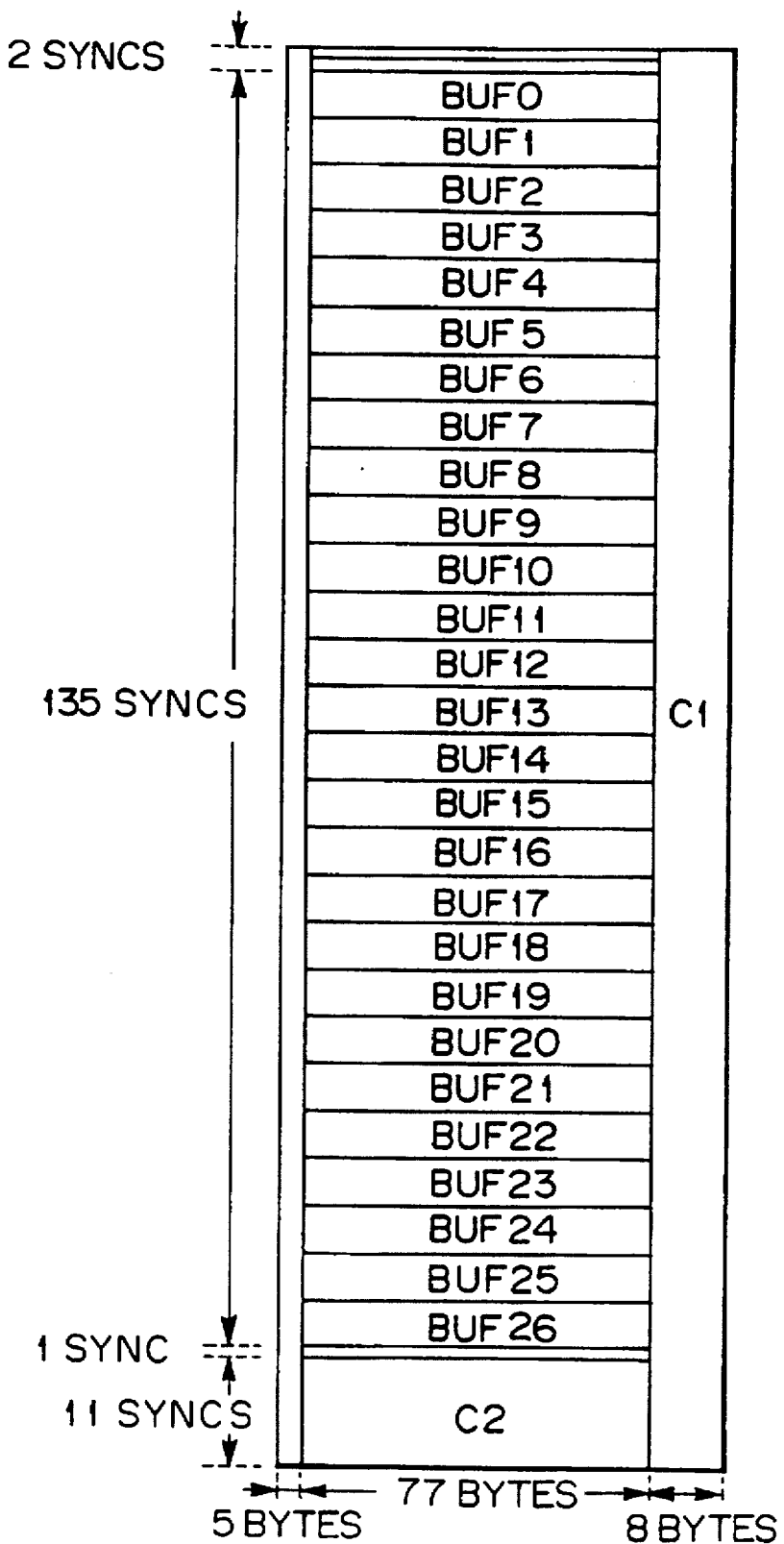
FIG. 13 is a diagram in which sync blocks of one video sector are arranged in the vertical direction.

FIG. 13 is a diagram in which the sync blocks of one video sector are arranged in the vertical direction. In one video sector shown in FIG. 13, the first two sync blocks and one sync block just before the vertical parity C2 are used only for the VAUX data. The video data which was compressed by using a DCT (discrete cosine transformation) is stored in a portion other than the VAUX data, horizontal parity C1, and vertical parity C2. In detail, 135 sync blocks shown in FIG. 13 relate to a storage area of the video data. In the diagram, numerals of BUF (buffer) 0 to BUF 26 are written. The BUF indicates one buffer unit (of five sync blocks).

Figures 14A, 14B, 14C:
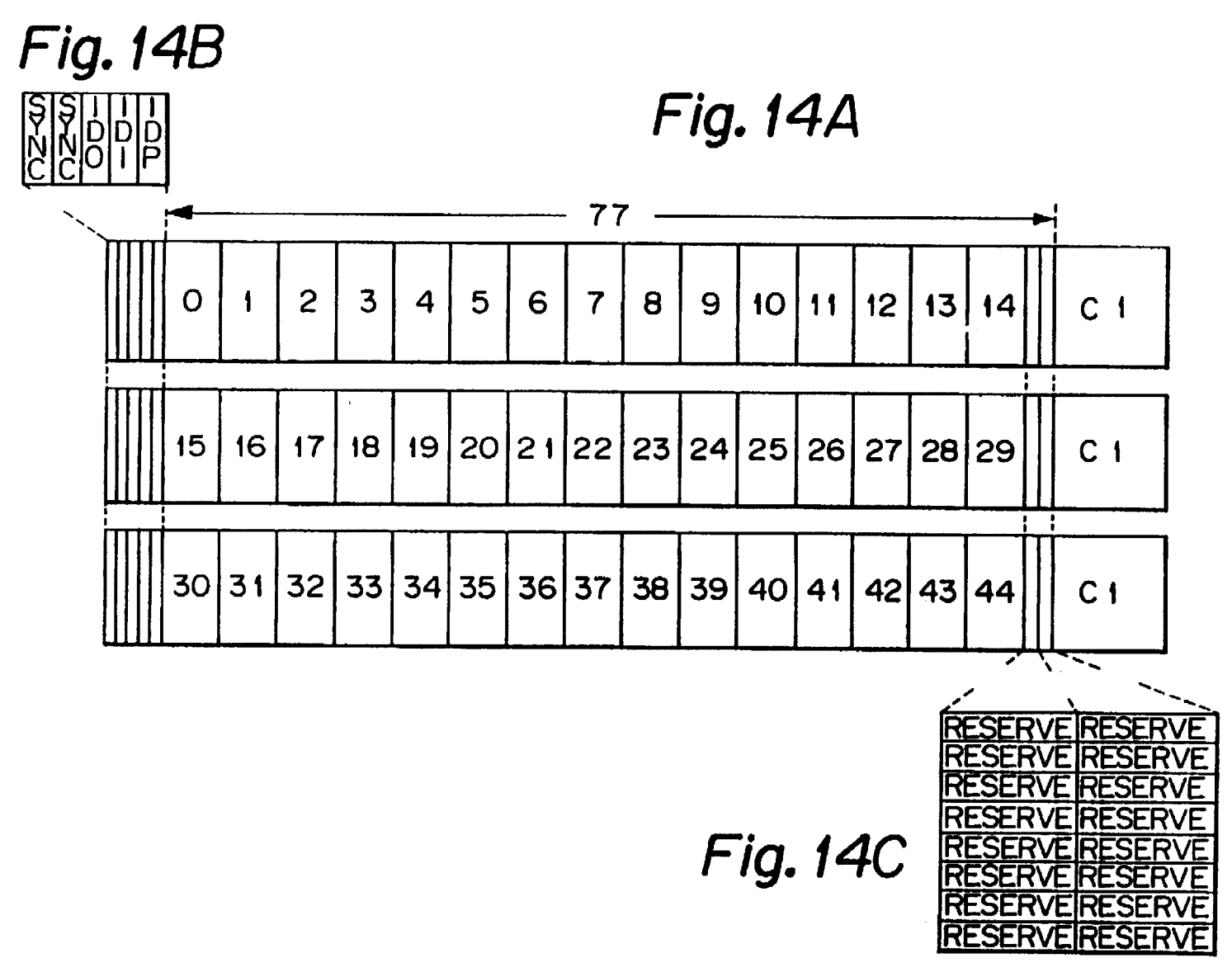

FIG. 14 is a diagram showing sync blocks which are used only for the VAUX data. Upper two sync blocks in FIG. 14 correspond to the upper two sync blocks in FIG. 13. The lowest sync block in FIG. 14 corresponds to one sync block just before C1 in FIG. 13. When 77 bytes are divided on a pack unit basis of five bytes, two bytes remain. In this instance, however, such two bytes are not particularly used to reserve. When assigning the numbers in a manner similar to that in the audio signal, 45 packs of 0 to 44 per one track are assured.

Figure 15:
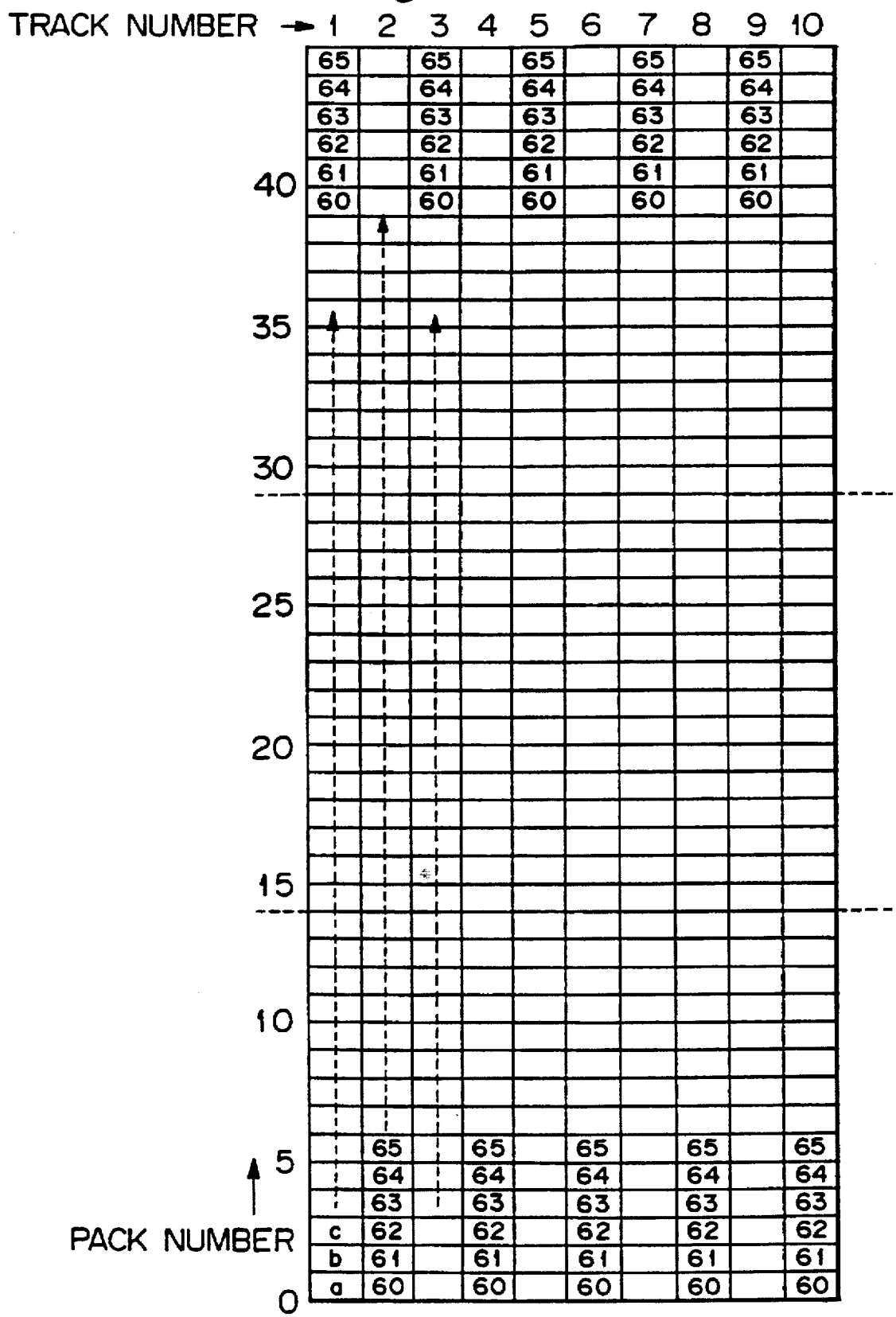
FIG. 15 is a diagram in which 45 packs of synch blocks which are used only for the VAUX data are extracted and described in the track direction.

A diagram in which such 45 packs of one track are described by 10 tracks (one frame in the NTSC) is FIG. 15. In FIG. 15, numerals of 60 to 65 indicate values (hexadecimal numbers) of the pack headers. A portion in which the pack headers have been recorded is a main area. The pack headers are recorded 10 times in 10 tracks in a manner similar to the pack headers of the audio signal. Indispensable items such as television system, picture plane aspect ratio, and the like which are necessary to reproduce the video data have mainly been stored in those pack headers. Thus, the data in the main area can be also reproduced even in case of a scratch in the lateral direction, a one-side channel clog, or the like which is likely to occur in the tape transport.

All of the remaining packs excluding the main area are sequentially connected and are used as an optional area. Namely, in a manner similar to the AAUX data, the packs in the main area are connected like a, b, c, d, e, d, f, h, . . . by skipping the packs in the direction of arrows. In one video frame, 390 packs (525 lines/60 Hz) or 468 packs (625 lines/50 Hz) are prepared as an optional area. The optional area is handled in a manner similar to that of the AAUX data.

IDP in the ID section denotes a parity to protect ID0 and ID1 and the same system is used in the sector of each of the audio, video, and subcode. By using the IDP, a reliability for the ID can be raised.

FIGS. 16A and 16B show data which is recorded in the ID section. FIG. 16A shows data regarding the presync, postsync, and C2 parity sync. ID1 denotes the area to store sync numbers in the track. The numbers of 0 to 168 are successively recorded in this area by a binary notation for the portions from the presync of the audio sector to the postsync of the video sector. The track numbers in one video frame are recorded in the lower four bits of ID0 and the number is recorded at a ratio of one track number per two tracks. Both of them can be distinguished by azimuth angles of the heads.

FIG. 16B shows data regarding the syncs of the audio data, video data, and VAUX. Four bits of sequence numbers (SEQ0 to SEQ3) are allocated to the upper four bits of ID0. Twelve kinds of numbers of 0000 to 1011 are allocated to the video frames. Thus, whether the data obtained upon reproduction at a variable speed is the same data in the same frame or not can be distinguished.

An application ID, an AP1, and an AP2 have been stored in the upper three bits of ID0 in the presync, postsync, and sync of the parity C2. Therefore, AP1 is recorded eight times and AP2 is recorded 14 times. By writing many times as mentioned above and distributing the writing positions, a reliability of the application ID can be raised and the ID can be protected.

FIG. 17 is an enlarged diagram of the subcode sector. The subcode sector comprises a preamble of 1,200 bits, a subcode area of 1,200 bits (12 sync blocks), and a postamble of 1,325 bits (or 1,200 bits). The preamble is the run-up for pull-in of the PLL. The postamble is a guard area.

FIG. 18 shows a structure of one sync block of the subcode. One sync block is constructed by 12 bytes and first five bytes has a structure similar to that of the first five bytes of the audio sync or video sync. Subcode data is recorded in the next five bytes. The subcode data is recorded in a pack structure similar to the AAUX or VAUX (one pack per one sync block). The horizontal parity C1 is provided for remaining two bytes.

The subcode sector doesn't have a product code construction like an audio sector or video sector. Namely, different from the audio sector and video sector, the vertical parity C2 is not added. Since the subcode is mainly used for a high speed search and the vertical parity C2 cannot be read out together with the horizontal parity C1 in its limited envelope, the vertical parity C2 is not provided. In order to enable a high speed search at about a 200-times speed, the sync length is also set to a short length such as 12 bytes. Further, the preamble is longer than that of the other sectors. This is because since the subcode sector is used for an application such as an index recording which is frequently rewritten and the subcode sector is located at the last position of the track, an adverse influence is exerted in a form such that all of the deviations in the former half portions of the track are added.

FIGS. 19A and 19B show a structure of ID0 and ID1 in the sync blocks of the subcode which is used for a high speed search. FIG. 19A shows a structure of the 0th to sixth sync blocks and FIG. 19B shows a structure of the sync blocks other than the 0th to sixth sync blocks. In the subcode sector, the contents of the former half five tracks (525 lines/60 Hz) or six tracks (625 lines/50 Hz) in the data section are different from those of the latter half portion.

In FIG. 19A, an F/R flag indicative of a distinction about whether it is the former half five tracks or latter half five tracks of one frame in the variable speed reproducing mode or high speed search mode is provided for the most significant bit. AP33, AP32, and AP31 as application IDs are provided in three bits subsequent to the F/R flag. Absolute track numbers are provided in a range from the latter four bits of ID0 to the former four bits of ID1. The absolute numbers are sequentially recorded from the head of a tape. Syncs 3, 2, 1, and 0 are allocated to the latter half four bits of ID1, respectively. They are the sync numbers in the track.

As shown in FIG. 19B, the F/R flag is provided for the most significant bit. An index ID, a skip ID, and an PPID (Photo Picture ID) are sequentially stored in the next three bits in accordance with this order from the upper bit. The index ID is used for an index search used in a conventional analog VCR and the skip ID is the ID for cutting an unnecessary scene like a commercial scene. The PPID is used for a photo (still image) search. The absolute track numbers are provided for portions from the latter half four bits of ID0 to the former half four bits of ID1. The syncs 3, 2, 1, and 0 are sequentially allocated to the lower four bits of ID1, respectively. They are the sync numbers in the track.

FIG. 20 shows a diagram in which twelve packs of one track of the subcode of ten tracks (of one frame in the NTSC) are arranged. Alphabets of capital letters indicate the main areas and alphabets of small letters indicate the optional areas, respectively. As will be also obviously understood from FIG. 20, the contents of the former half five track and latter half five tracks are different.

Data such as time code, recording year/month/day, and the like necessary for a high speed search is stored in the main area. The high speed search can be performed on a pack unit basis.

The optional areas differ from the areas in which all of them are connected and used like AAUX data or VAUX data. This is because since the protection of the parity is weak, the contents are distributed to the upper and lower portions every track and the same data is recorded many times in the former and latter half portions of the track, thereby protecting the data. Therefore, six packs of each of the former and latter half portions can be used as an optional area. The construction mentioned above is common to the system of 525 lines/60 Hz and the system of 625 lines/50 Hz.

The index ID of the digital VCR is stored in ID0 of the subcode shown in FIG. 19 and is written ten times in the portions other than the portions of the sync numbers of 0 and 6. The index ID is recorded, for example, for five seconds and the erasing and after-recording can be performed. As mentioned above, one sync of the subcode is so short to be 12 bytes, so that a high speed search at a 200-times speed can be performed.

(C) With respect to a REC start/end flag and the index ID

FIG. 21 shows a VAUX source control pack (a value of a pack header is equal to 61h) of the main area of VAUX which is recorded together with an image signal. In FIG. 21, SS (source situation) is recorded in the lower two bits of PC1 and the other bits are set for reservation. A REC start flag is recorded in the MSB of PC2. The REC start flag is an index indicative of a recording start position. When the flag is equal to 0, it shows a recording start point and, when it is equal to 1, it indicates a non-recording start point, respectively. As a REC start flag, the frames for one second, namely, 30 frames are recorded in case of the system of 525 lines/60 Hz or 25 frames are recorded in case of the system of 625 lines/50 Hz. "1" is recorded in the upper second and fifth bits of PC2, a REC mode is recorded in the upper third and fourth bits, and DISP (display selecting mode) is recorded in the lower three bits, respectively. An FF (frame/field) flag is recorded in the MSB of PC3, an FS (first/second) flag is recorded in the second bit, an FC (frame change) flag is recorded in the third bit, an IL (interlace) flag is recorded in the fourth bit, an ST (still field picture) flag is recorded in the fifth bit, an SC (still camera picture) flag is recorded in the sixth bit, and a BCSYS (broadcast system) is recorded in the remaining two bits, respectively. "1" is recorded in the MSB of PC4. A genre category is recorded in the other bits. A recording position on the tape of the pack is 61h shown in FIG. 15. By recording the REC start flag at the time of the recording start, for example, for one second, a high search of about a 30-times speed can be performed.

FIG. 22 shows an AAUX source control pack (a value of the pack header is 51h) of the main area of AAUX which is recorded together with the audio signal. In FIG. 22, the SS (source situation) is recorded in the lower two bits of PC1 and the other bits are set for reservation. The REC start flag is recorded in the MSB of PC2. The REC start flag is the index indicative of the recording start position. When it is equal to 0, the recording start frame is shown and, when it is equal to 1, other frame is shown, respectively. A REC end flag is recorded in the next bit. The REC end flag is an index indicative of the recording end position. When it is equal to 0, a recording end frame is shown and, when it is equal to 1, the other frame is shown. The REC mode is recorded in the next three bits and an insert channel is recorded in the remaining three bits. A DRF (direction) flag is recorded in the MSB of PC3 and a speed is recorded in the other bits. "1" is recorded in the MSB of PC4 and a genre category is recorded in the other bits, respectively. The recording position on the tape of the pack is a location of 51 shown in FIG. 10. The REC start flag is recorded, for example, for a period of time of one video frame at the time of the start of the recording. Thus, the recording start point can be searched at a low speed of about a 2-times speed. At the end of the recording, the REC end flag in the same pack is recorded for a period of time of one video frame. Thus, the recording end point can be searched at a low speed of about a 2-times speed.

A speed of a high speed search is decided by a hit ratio (probability in which, when the head scans once, a desired signal is included there). The hit ratio can be raised by extending a writing time. When the writing time is extended, a time necessary to erase also becomes long by only a time corresponding to such a long writing time. For example, in case of recording a television image, the index ID is recorded for a few seconds when recording on a unit of 30 minutes or one hour. When erasing, a waiting time soon comes. Therefore, when setting conditions such that the index ID can be hit at a 200-times speed and a recording time can be permitted, it is proper to set a recording time of the index ID to five seconds.

As mentioned above, the REC start flag of VAUX is recorded for one second. For example, in case of the camera integrated type VTR, since the operations from the recording to the pause and from the pause to the recording are repeated, it is proper to record the REC start flag for one second.

Further, as mentioned above, the REC start flag and REC end flag of AAUX are recorded for a period of time of one video frame (10 tracks or 12 tracks). By recording those flags, the generation of noises which are generated at the boundary of the audio data can be prevented. Since those flags (indices) are not used for a high speed search, it is sufficient to record them in one frame. When they are used for search, a double-speed search can be performed. Although the REC end flag is recorded in response to an instruction of the recording end, since it is recorded in only one frame, there is no problem in particular.

Figure 23A:
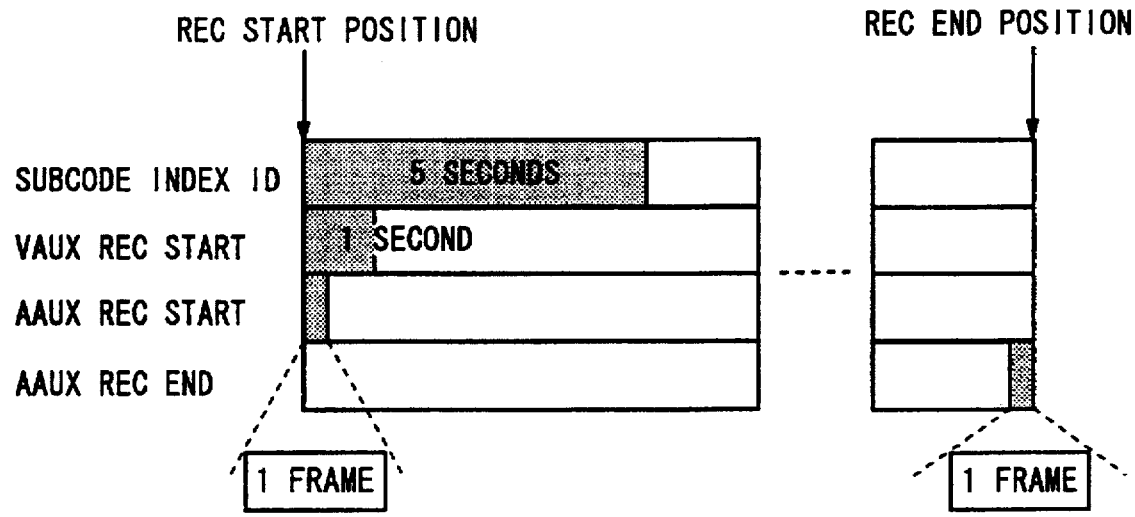
FIGS. 23A and 23B are diagrams each showing a recording example of an index ID of a subcode, an REC start flag of VAUX, and an REC start flag and an REC end flag of AAUX.
Figure 23B:
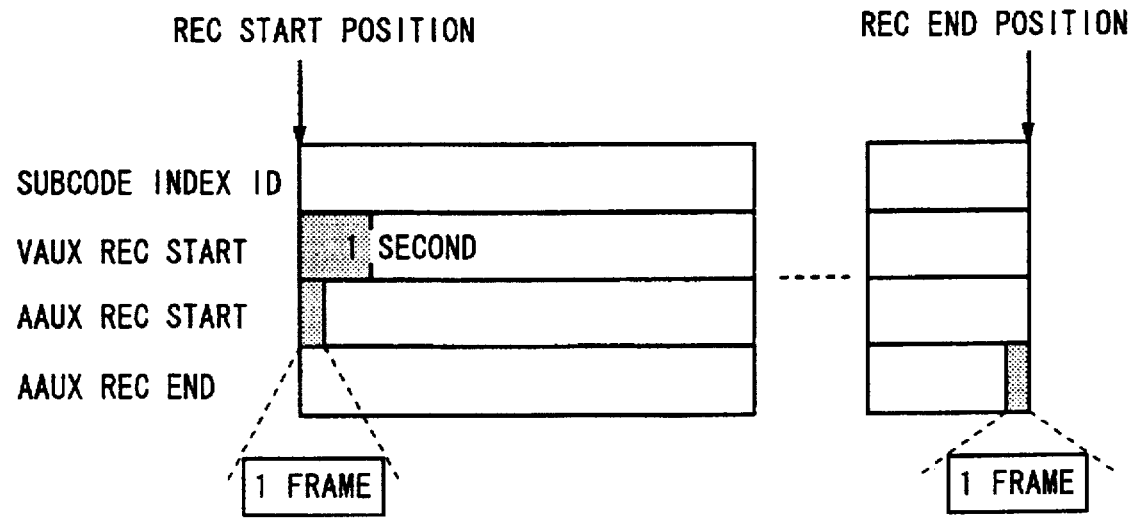

FIGS. 23A and 23B are diagrams showing a recording example of the index ID of the subcode, REC start flag of VAUX, and REC start flag and REC end flag of AAUX. FIG. 23A shows a recording example in a desk-top type digital VCR. FIG. 23B shows a recording example in a camera integrated type VTR. In FIG. 23A, when the recording is started, the index ID is recorded for five seconds and the REC start flag of VAUX is recorded for one second. Further, the REC end flag of AAUX is recorded by an amount of one video frame. When the recording is finished, the REC end flag of AAUX is recorded by an amount of one video frame.

In FIG. 23B, when the recording is started, the REC start flag of VAUX is recorded for one second and the REC start flag of AAUX is recorded by an amount of one video frame. When the recording is finished, the REC end flag of AAUX is recorded by an amount of one video frame.

As mentioned above, the recording methods in the desk-top type digital VCR and the camera integrated type VTR differ. Namely, the index ID is used to search the head for the record images of a certain number as in case of, for example, a television recording or the like and is fundamentally unnecessary in the camera integrated type VTR. In the camera integrated type VTR which repeats the recording in a short time, it is difficult on control to record the index ID for five seconds. Therefore, in the camera integrated type VTR, the index ID is after-recorded. Because of such reasons, the recording methods are different. In the subcode area, although the index or the like can be after-recorded, it is impossible to rewrite only the VAUX or AAUX data. This is because since the VAUX data and AAUX data are recorded together with the video signal and audio signal, the VAUX data or AAUX data cannot be solely rewritten.

As mentioned above, the index ID is recorded for searching the head of a program and by using it, the 200-times speed search can be performed. Generally, although the video data and audio data are set to one program, it is also possible to pay attention to only the audio data and to record the index ID for the head search of a music piece. In the desk-top type digital VCR, the REC start flag of VAUX is recorded to keep a compatibility with the camera integrated type VTR and the index ID is used at the time of a high speed search. In the camera integrated type VTR, after the REC start button was depressed, the index ID is recorded for one second and the head search of the recording start point is performed by the 30-times speed search. Therefore, it is possible to immediately return to the recording start point. The above operation is effective in the case when the camera integrated type VTR is carried or it is in the stand-by mode or the like, a recording mode is erroneously set and a video image is recorded irrespective of a will of the user and the recording is performed in vain. Further, the position at which the REC start button was depressed is an edition point (scene change) and an editor can search the REC start point at a 30-times speed. The REC start flag and REC end flag of AAUX indicate one delimiter of the audio data. Thus, it is possible to prevent that noises or a large sound is generated. A double-speed search can be performed for retry (return to the after-recording start point) when the after-recording fails. Since the REC start flag and REC end flag of AAUX are recorded by an amount of only one video frame, the double-speed search can be executed.

FIGS. 24A, 24B, 24C, 25A, 25B, 25C, 26A, 26B are 26C are diagrams which are used for explanation of the REC end flag of AAUX. FIGS. 24A, 24B and 24C are diagrams in case of recording only the REC start flag. In FIG. 24A, the REC start flag is recorded by an amount of one video frame at the start of the recording and nothing is recorded at the end of the data. FIG. 4B shows a case where an overwriting is performed on the data recorded as shown in FIG. 24A. The REC start flag is recorded to the first one video frame of the overwritten data. When the recording of the data is finished, nothing is recorded in a manner similar to FIG. 24A. Therefore, as shown in FIG. 24C, the original data is discontinuously recorded after the end of the overwritten data. When no REC end flag exists, a boundary between the original data and the overwritten data cannot be detected. Therefore, there is a case where a large sound is generated and the speaker or the like is broken.

FIGS. 25A, 25B and 25C are diagrams in case of recording only the REC end flag. In FIG. 25A, the recording of data is started from the beginning at the start of the recording and the REC end flag is recorded at the end of the data recording. FIG. 25B shows a case where the overwriting is performed on the data recorded as shown in FIG. 25A. When the overwritten data is started, the REC start flag is not recorded but the REC end flag is recorded at the end of the data. Therefore, as shown in FIG. 25C, the original data is discontinuously recorded before the start of the overwritten data. When no REC start flag exists, such a boundary cannot be detected. Therefore, in a manner similar to the explanation in FIGS. 24A, 24B and 24C, there is a case where a large sound is generated and the speaker or the like is broken.

FIGS. 26A, 26B and 26C are diagrams in case of recording the REC start flag and REC end flag. In FIG. 26A, the REC start flag is recorded at the start of the recording and the recording is started. When the recording is finished, the REC end flag is recorded. FIG. 26B shows a case where the overwriting is performed on the data recorded as shown in FIG. 26A. At the start of the overwritten data, the REC start flag is recorded. At the end of the overwritten data, the REC end flag is recorded. Therefore, as shown in FIG. 26C, a discontinuity point between the overwritten data and the original data can be detected. Thus, not only the recording start point but also the recording end point can be detected. For example, by muting an output at the discontinuity point, a breakage of the speaker or the like can be prevented.

There is only the REC start flag in VAUX and no REC end flag exists. This is because in case of video data, even if the recording as shown in FIGS. 24A to 26C is executed, the image is merely fluctuated at the boundary of the data and the monitor is not broken. The apparatus cannot judge whether the recording will be finished after one second from now on and the REC end flag cannot be recorded for one second. In a manner similar to the case of the audio data, there is considered a method of recording the REC end flag for a period of time of one video frame. However, since the monitor is not broken even if there is no REC end flag, there is no need to purposely execute a complicated process such that a muting image is outputted for the fluctuation of the image. Therefore, the REC end flag of VAUX is not provided. Although the REC end flag of AAUX is recorded after the recording end was instructed, since it is recorded for only one frame, there is no problem in particular. When the recording end point of the video is searched, it is sufficient to store the absolute track number of the end point into a memory provided for the cassette and to search the absolute track number. In this case, since the absolute track number is recorded in the subcode area, the search at the 200-times speed can be performed.

Figures 27, 28:
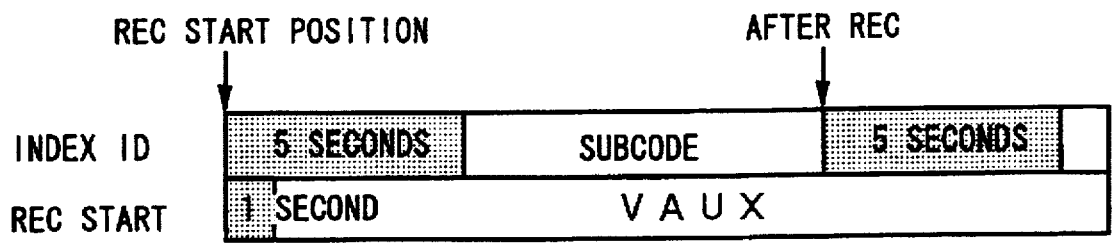
FIG. 27 is a diagram regarding the recording of an index ID and the REC start flag.
FIG. 28 is a diagram showing a source pack of VAUX.

The case of searching by using the index ID and the REC start flag of VAUX will now be described. FIG. 27 is a diagram regarding the recording of the index ID and REC start flag. In FIG. 27, both of the index ID and REC start flag are recorded at the recording start position. The index ID is after-recorded. The REC start flag is not recorded at such an after-recording position. The head search of the program can be performed by using the index ID and REC start flag.

For example, in the search in the forward direction, whether both of the index ID and REC start flag exist or not is detected. When only either one of the signals is detected, it is regarded that such a position is not the head of the program. When both of them are detected, such a position is the head of the program. In the search in the opposite direction, the index ID is first detected at the beginning and the REC start flag is subsequently detected. On the basis of the detection result, the head of the program is detected. As mentioned above, even in the case where the index ID is after-recorded, the head of the program can be retrieved by using both of the index ID and REC start flag, so that the search can be easily executed.

The search using the index ID is executed at the 200-times speed as mentioned above. The search using the REC start flag of VAUX is performed at the 30-times speed as mentioned above. In case of simultaneously searching both of the index ID and the REC start flag, since there is a fear such that the REC start flag is skipped in the execution of the 200-times speed search, the search is performed at the 30-times speed. Thus, a target program can be immediately retrieved.

The image in which it is recorded by the camera integrated type VTR and the index ID is after-recorded and the image which was television recorded by the digital VCR can be identified by a source pack (a value of the pack header is equal to 60h) of VAUX shown in FIG. 28. Namely, all of the bits of PC1 and lower four bits of PC2 are used for recording of data regarding a television channel. By identifying the data in such an area, the above identification can be performed and the kind of tape (whether it is a soft tape or not) can be identified. On the track, as shown in FIG. 15, since the data is recorded adjacently to the source control pack (a value of the pack header is equal to 61h) of VAUX, their contents can be also simultaneously read upon searching. Thus, even if an image is recorded by the camera integrated type VTR after the tape on which the image was television recorded by the digital VCR and, further, a desired point is after-recorded by the index ID, the head of a desired program can be immediately searched.

According to the invention, by recording the REC start flag into VAUX and recording the REC start flag and REC end flag into AAUX, the recording start point and recording end point can be easily searched. By muting at the boundary of the audio data, a breakage of the speaker or the like can be prevented and there is no need to perform a complicated operation. By using both of the index ID and REC start flag of VAUX, even when the index ID is after-recorded, a desired program can be easily searched.

We claim:

1. A digital recording and reproducing apparatus for recording and reproducing digital video auxiliary information and digital audio auxiliary information to and from a magnetic tape having tracks thereon, each of said tracks having a video area in which a digital video signal is recorded and an audio area in which a digital audio signal is recorded, said video and audio areas having video auxiliary and audio auxiliary areas, respectively, said apparatus comprising:

means for recording video auxiliary information including video recording start identification information representing an initiation of a recording operation into said video auxiliary areas of a first predetermined number of successive tracks representing a first predetermined period of time when said recording operation is initiated; and means for recording audio auxiliary information including audio recording start identification information representing said initiation of said recording operation into said audio auxiliary areas of a second predetermined number of successive tracks representing a second predetermined period of time when said recording operation is initiated, said first predetermined period of time being different from said second predetermined period of time.

2. The apparatus of claim 1, wherein said first predetermined number of successive tracks is different from said second predetermined number of successive tracks.

3. The apparatus of claim 1, further comprising means for reproducing video auxiliary information from said video auxiliary area of selected tracks in a high speed reproducing mode; and means for identifying a beginning of a recording start point when the reproduced video auxiliary information includes said video recording start identification information.

4. The apparatus of claim 1, further comprising means for reproducing audio auxiliary information from said audio auxiliary area of selected tracks in a high speed reproducing mode; and means for identifying a beginning of a recording start point when the reproduced audio auxiliary information includes said audio recording start identification information.

5. The apparatus of claim 1, wherein said video and audio auxiliary information are formed of data packs having a common pack structure; and each said video and audio recording start identification information is stored in one of said data packs recorded in said respective video and audio auxiliary areas.

6. The apparatus of claim 1, wherein each track on the magnetic tape includes a subcode area in which subcode data is recorded; and said apparatus further comprises means for after-recording subcode recording start identification information representing a beginning of a recording start point in a predetermined number of tracks at which the recording operation was initiated.

7. The apparatus of claim 6, further comprising means for reproducing in a high speed search mode the video auxiliary information from said video auxiliary area and the subcode data from the subcode area of selected tracks; and means for identifying a beginning of a recording start point when both the reproduced video auxiliary information includes said video recording start identification information and the reproduced subcode data includes said subcode recording start identification information.

8. The apparatus of claim 1, wherein each track on the magnetic tape includes a subcode area in which subcode data is recorded; and said apparatus further comprises means for recording subcode recording start identification information representing said initiation of said recording operation into said subcode areas of a third predetermined number of successive tracks representing a third predetermined period of time when said recording operation is initiated.

9. The apparatus of claim 8, wherein said third predetermined number of successive tracks is greater than both said first and second predetermined number of successive tracks such that the subcode recording start identification information is recorded in the subcode area of successive tracks for an amount of time greater than the amount of time both the video and audio recording start identification information are recorded in the respective video and audio auxiliary areas.

10. The apparatus of claim 1, wherein said means for recording audio auxiliary information is operable to record recording end identification information representing a termination of the recording operation into said audio auxiliary areas of a predetermined number of successive tracks when said recording operation is terminated.

11. The apparatus of claim 10, further comprising:

means for reproducing the audio auxiliary information recorded in said audio auxiliary areas of each of said tracks; and means for identifying a recording end point when the reproduced audio auxiliary information includes the recording end identification information.

12. The apparatus of claim 11, further comprising means for providing an audio output representing the digital audio signal reproduced from the magnetic tape; and means for muting the audio output for a predetermined length of time when said means for identifying identifies a recording end point.

13. A method of recording and reproducing digital video auxiliary information and digital audio auxiliary information to and from a magnetic tape having tracks thereon, each of said tracks having a video area in which a digital video signal is recorded and an audio area in which a digital audio signal is recorded, said video and audio areas having video auxiliary and audio auxiliary areas, respectively, said method comprising the steps of:

recording video auxiliary information including video recording start identification information representing an initiation of a recording operation into said video auxiliary areas of a first predetermined number of successive tracks representing a first predetermined period of time when said recording operation is initiated; and recording audio auxiliary information including audio recording start identification information representing said initiation of said recording operation into said audio auxiliary areas of a second predetermined number of successive tracks representing a second predetermined period of time when said recording operation is initiated, said first predetermined period of time being different from said second predetermined period of time.

14. The method of claim 13, wherein said first predetermined number of successive tracks is different from said second predetermined number of successive tracks.

15. The method of claim 13, wherein said video and audio auxiliary information are formed of data packs having a common pack structure; and each said video and audio recording start identification information is stored in one of said data packs recorded in said respective video and audio auxiliary areas.

16. The method of claim 13, further comprising the step of recording a recording end identification information representing a termination of the recording operation into said audio auxiliary areas of a predetermined number of successive tracks when said recording operation is terminated.

17. The method of claim 16, further comprising the steps of reproducing the audio auxiliary information recorded in said audio auxiliary areas of each of said tracks; and identifying a recording end point when the reproduced audio auxiliary information includes the recording end identification information.

18. The method of claim 17, further comprising the steps of providing an audio output representing the digital audio signal reproduced from the magnetic tape; and muting the audio output for a predetermined length of time when a recording end point is identified.

\* \* \* \* \*